April 29, 1924.
H. BRANDRUP
COMBINATION SOLDERING IRON AND BLOWTORCH
Filed March 28, 1921
1,492,508
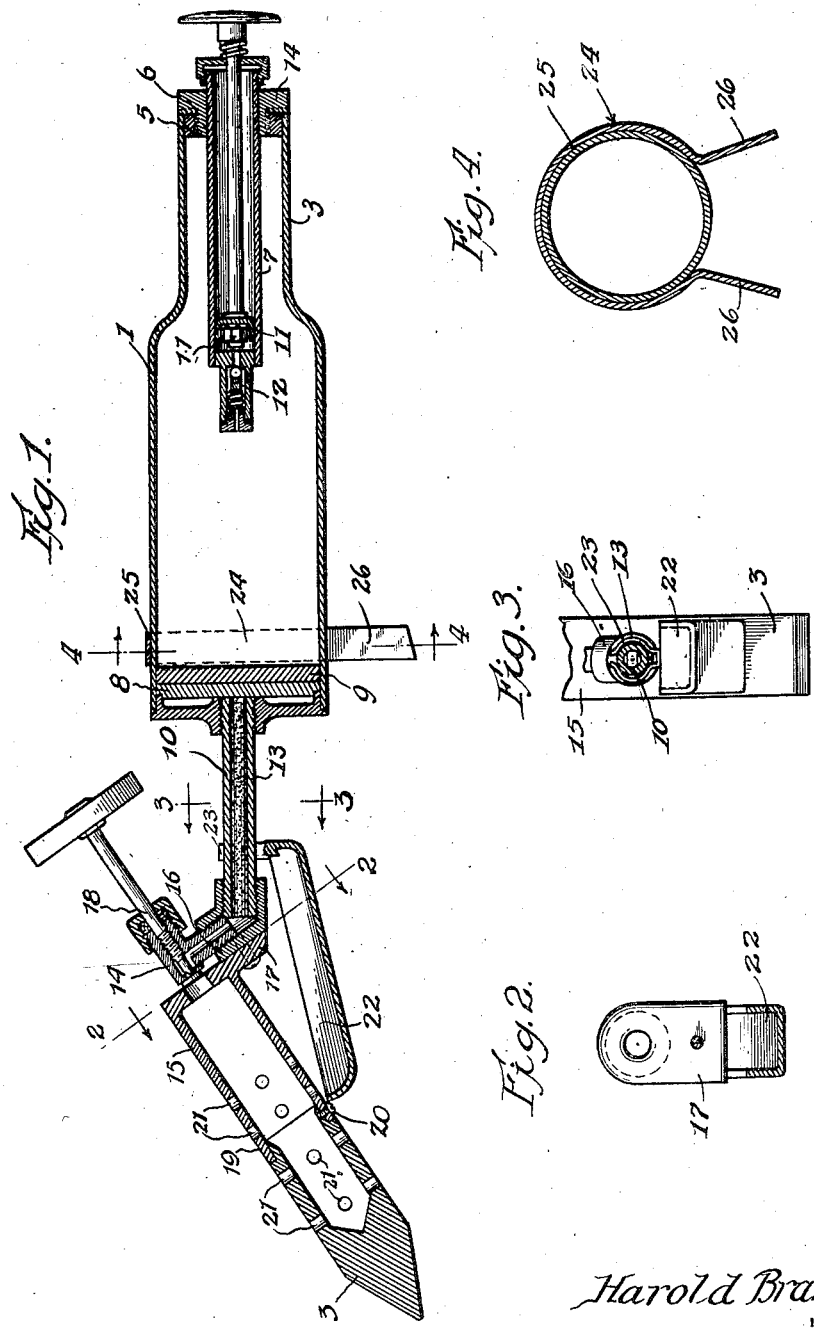
Harold Brandrup
INVENTOR
BY Victor J. Evans
ATTORNEY
WITNESS:

Patented Apr. 29, 1924.

1,492,508

UNITED STATES PATENT OFFICE.

HAROLD BRANDRUP, OF MAYWOOD, ILLINOIS.

COMBINATION SOLDERING IRON AND BLOWTORCH.

Application filed March 23, 1921. Serial No. 456,115.

*To all whom it may concern:*

Be it known that I, HAROLD BRANDRUP, a citizen of the United States, residing at Maywood, in the county of Cook and State of Illinois, have invented new and useful Improvements in Combination Soldering Irons and Blowtorches, of which the following is a specification.

This invention relates to a combination blow torch and soldering iron and an object of the invention is to provide a device of this nature, which is comparatively light in construction and readily portable providing means whereby a soldering iron may be heated in a comparatively short time and is ready for use at any time and any place without requiring an additional blow torch or burner to heat the soldering iron.

Another object of this invention is to provide a combination blow torch and soldering iron as specified which is constructed so that the soldering point or iron may be easily removed, to permit the device to be used as a blow torch and also one which may be conveniently handled during use for directing the flame of the blow torch at any desired point.

Other objects of the invention will appear in the following detailed description and in the accompanying drawing wherein:

Fig. 1 is a longitudinal section through the torch.

Fig. 2 is a cross section on the line 2—2 of Fig. 1.

Fig. 3 is a cross section on the line 3—3 of Fig. 1.

Fig. 4 is a cross section on the line 4—4 of Fig. 1, showing the supporting stand.

Referring more particularly to the drawing, the improved combination blow torch and soldering iron comprises a tank or reservoir 1 for containing the gasoline or analogous fuel used in the torch structure for heating the soldering point 3 which is constructed of bronze, copper or similar material. The reservoir 1 may be constricted at one end as shown at 3 to permit a relatively firm grip thereon by one hand of the user and the outer end of the constricted portion 3 is closed by a closure plug 4 threaded into the collar 5 and against the gasket 6 to provide a fluid tight joint or closure. The plug 4 carries a pump structure 7 adapted to force air under pressure within the container or reservoir 1 to force the gasoline or analogous volatile fluid through the strainers 8 and 9 into the delivery tube 10. The pump structure 7 comprises a reciprocatory piston 11 which compresses the air and forces it into the container or receptacle 1 through a check valve structure 12, the latter preventing the drawing of the fluid from the container into the pump structure 7 upon retracting movement of the piston 11.

The tube 10 is threaded or otherwise suitably detachably connected to the end of the container 1 remote from the plug 4 and it has a wick 13 therein which co-acts with the disc strainers 8 and 9 in purifying the gasoline and breaking it up into minute particles prior to its passage into the valve chamber 14 from which it passes into the burning chamber or nozzle 15. The nozzle 15 has an elbow 16 attached to the lateral projection 17 formed thereon, by means of which elbow the tube 10 and valve casing 14 are connected to the nozzle 15. An adjustable needle valve 18 is carried by the valve casing 14 and controls the flow of gas or combustible fuel into the nozzle 15. The soldering point 3 is provided with an annular reduced end portion 19 which engages in the outer end of the nozzle 15. The soldering point 3 is provided with an annular reduced end portion 19 which engages in the outer end of the nozzle 15 and the soldering point 3 is detachably connected to the nozzle 15 by screws 20 so as to permit the soldering point 3 to be easily detached from the nozzle 15 to permit the device to be used as a blow torch. The nozzle 15 and soldering point 3 are provided with openings 21 to permit the escape of burned gases therefrom.

A warming cup 22 is provided which has a spring clip 23 attached to one end the said clip adapted to frictionally engage the tube 10 and support the warming cup 22 in position to initially heat or "warm up" the burner structure when first starting operation of the combined blow torch and soldering iron. After the torch has become properly warmed the warming cup 22 may be removed by merely expanding the spring socket 23 and slipping it off the tube 10. As shown in Fig. 1 of the drawing the wick 13 extends through the entire length of the tube 10.

A stand 24 is provided which is constructed of suitable spring material having a substantially circular portion 25 which engages about the container 1 and outwardly extending leg portions 26. The stand 24 is constructed so that you can swing the torch in any direction for accurately directing the flow of flame from the nozzle 15 when the device is used as a torch or for properly positioning the soldering point 3 when the device is supported upon the stand and the provision of the strainers 8 and 9, which preferably are made of chamois, leather or the like in connection with the strainer 13 will prevent any foreign matter from entering the burning chamber and will result in a blue flame of maximum heating intensity.

It is, of course, to be understood that the invention may be constructed in various other manners and the parts associated in different relations and therefore, I do not desire to be limited in any manner except as set forth in the claim hereunto appended.

Having thus described my invention what I claim is:

A combined soldering iron and blow torch comprising a fuel reservoir, a tube connected to one end of said reservoir, strainer members positioned in the reservoir adjacent the inlet to said tube, a straining wick in said outlet tube, an elbow coupling connected to the outer end of said tube, a nozzle, a lateral projection on said nozzle and attached to said elbow whereby said nozzle will extend at an obtuse angle to said reservoir, a needle valve carried by the elbow and aligning with the central axis of the nozzle, and a soldering iron detachably connected to said nozzle.

In testimony whereof I affix my signature.

HAROLD BRANDRUP.